US009571660B2

(12) United States Patent
Klemm et al.

(10) Patent No.: US 9,571,660 B2
(45) Date of Patent: Feb. 14, 2017

(54) CONFERENCE CALL QUESTION MANAGER

(71) Applicant: Avaya, Inc., Santa Clara, CA (US)

(72) Inventors: Reinhard Klemm, Basking Ridge, NJ (US); Parameshwaran Krishnan, Basking Ridge, NJ (US); Navjot Singh, Somerset, NJ (US)

(73) Assignee: Avaya Inc., Santa Clara, CA (US)

( * ) Notice: Subject to any disclaimer, the term of this patent is extended or adjusted under 35 U.S.C. 154(b) by 14 days.

(21) Appl. No.: 14/512,087

(22) Filed: Oct. 10, 2014

(65) Prior Publication Data
US 2016/0105566 A1 Apr. 14, 2016

(51) Int. Cl.
H04M 3/42 (2006.01)
H04M 3/56 (2006.01)
H04L 12/58 (2006.01)
H04L 12/18 (2006.01)

(52) U.S. Cl.
CPC .......... H04M 3/565 (2013.01); H04L 12/1827 (2013.01); H04L 51/04 (2013.01)

(58) Field of Classification Search
CPC .................................................. H04M 3/567
USPC ............................... 379/202.01, 158, 265.01
See application file for complete search history.

(56) References Cited

U.S. PATENT DOCUMENTS

| | | | |
|---|---|---|---|
| 8,024,332 B2 | 9/2011 | Cao et al. | |
| 8,090,709 B2 * | 1/2012 | Liu | G06Q 30/02 707/713 |
| 8,478,819 B1 * | 7/2013 | Kornbluh | H04L 12/1818 370/260 |
| 8,838,699 B2 * | 9/2014 | Barlow | H04L 12/1818 709/203 |
| 9,049,696 B2 * | 6/2015 | Sansalone | H04M 1/72519 |
| 2003/0115170 A1 * | 6/2003 | Turner | G06N 5/022 |
| 2004/0235509 A1 * | 11/2004 | Burritt | H04M 3/42195 455/519 |
| 2007/0100939 A1 * | 5/2007 | Bagley | G06Q 10/10 709/204 |
| 2009/0016514 A1 * | 1/2009 | Miller | H04M 3/567 379/202.01 |
| 2009/0093240 A1 * | 4/2009 | Lang | H04L 12/1818 455/416 |
| 2009/0137257 A1 * | 5/2009 | Barber | H04L 12/1831 455/466 |
| 2009/0220064 A1 * | 9/2009 | Gorti | H04M 3/56 379/202.01 |
| 2012/0072845 A1 * | 3/2012 | John | G06F 17/30038 715/738 |

(Continued)

Primary Examiner — William Deane, Jr.
(74) Attorney, Agent, or Firm — Sheridan Ross P.C.

(57) ABSTRACT

Questions are received for a conference call. The questions are submitted electronically, such as by email or Instant Messaging (IM). The questions can be submitted before and/or during the conference call. The questions are clustered into one or more similar categories. The clustered questions are sent to participants of a conference. For example, the questions can be sent to a presenter of the conference call as an agenda to follow for a question and answer section of the conference call. Likewise, the questions may also be sent to the conference participants as an agenda of the question and answer section of the conference call. The presenter can discuss the questions with the conference participants based on the categorization of the submitted questions.

20 Claims, 7 Drawing Sheets

(56) References Cited

U.S. PATENT DOCUMENTS

2013/0174061 A1*  7/2013  Loganathan ............ H04L 51/04
                                              715/758
2013/0294595 A1*  11/2013  Michaud ........... H04M 3/42382
                                              379/202.01
2016/0006776 A1*  1/2016  Kashi .................... H04L 65/403
                                              709/204

* cited by examiner

| PRIORITY | | | TREND |
|---|---|---|---|
| 10 | CONF. ☑ Q2 REVENUE<br>☑ 1) HOW MUCH WAS OUR REVENUE IN Q2?<br>☑ 2) WHY DID OUR REVENUE DECLINE IN Q2?<br>☑ 3) WHAT IS THE PLAN TO INCREASE REVENUE BEYOND Q2? | | UP 50% |
| 8 | CONF. ☑ 401K PLAN<br>☑ 1) WHAT ARE THE CHANGES TO THE 401K PLAN?<br>☑ 2) DO THE 401k CHANGES AFFECT UNION EMPLOYEES? | | N/A |
| 5 | CONF. ☐ PRODUCT SHIPMENTS<br>☑ 1) DID WE SHIP PRODUCT X ON SCHEDULE?<br>   WHAT CAUSED PRODUCT X TO NOT SHIP ON TIME?<br>☐ 2) WHY DID WE DELAY SHIPMENT OF PRODUCT Y? | | DOWN 20% |

SELECT CONFERENCE TYPE
● ALL USERS
○ CATEGORY OF USERS
○ RANDOM SELECTION
○ FIRST SUBMITTER
○ SPECIFIC QUESTION

FIG. 3

CONFERENCE CALL QUESTION MANAGER

TECHNICAL FIELD

The systems and methods disclosed herein relate to conferencing systems and in particular to conference management systems.

BACKGROUND

Electronic conferencing systems have become pervasive within most enterprises. The types of conferences that are conducted can range from a simple voice conference to a large conference within a corporation. The current solutions for simple voice conferences are typically very efficient.

However, for large conference calls, the logistics for organizing the conference call are not always efficient. For example, a CEO of a large corporation may have a regular meeting where the CEO provides a status to all members of the corporation. In many cases, the members of the large corporation are geographically dispersed at various locations. For these types of conference calls, the conference attendees may submit questions prior to the conference call or during the conference call. The method of submitting the questions can vary. For example, questions may be submitted via email, Instant Messaging, and/or vocally. Keeping track of the questions can be a difficult task because of the volume of questions and because of the variety of sources of the questions.

SUMMARY

Systems and methods are provided to solve these and other problems and disadvantages of the prior art. Participants submit questions electronically to the conference call question manager. The questions can be submitted before and/or during the conference call. The conference call question manager clusters the questions into one or more similar categories. The questions, organized by clusters, can be viewed by all participants of a conference call. A presenter of the conference call can use the clusters to cover a broad swath of participant questions without the effort of sifting through each participant question and to set up an agenda to follow for a question and answer section of the conference call. Participants of a conference call can use the question clusters and questions to determine whether a question they have has been submitted already in this or a similar form, as a basis for additional questions, to emphasize or de-emphasize the perceived importance of question clusters and questions, or to better understand the interests and concerns of other participants. The conference call question manager may present different views for presenters/organizers than for other participants. For example, presenters might see individual questions and the identities of the questioners, whereas other participants might see only questions clusters. The presenter can discuss the questions with the conference participants based on the categorization of the submitted questions.

BRIEF DESCRIPTION OF THE DRAWINGS

FIG. 3 is a diagram of a window for displaying a presenter's view of a conference call.

DETAILED DESCRIPTION

Figure 1:
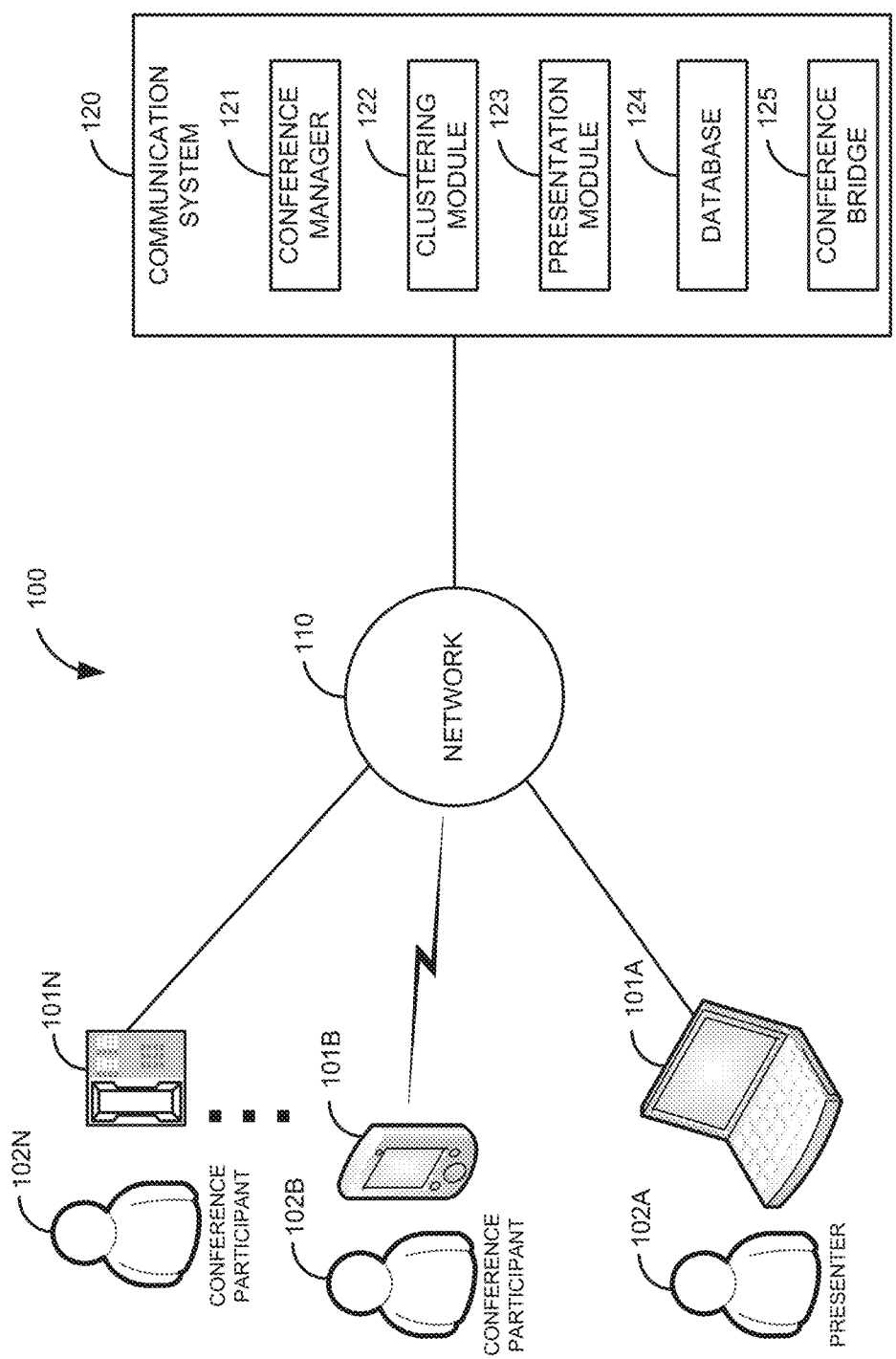
FIG. 1 is a block diagram of a first illustrative system for managing a conference call.

FIG. 1 is a block diagram of a first illustrative system 100 for managing a conference call. The first illustrative system 100 comprises communication endpoints 101A-101N, a network 110, and a communication system 120.

The communication endpoints 101A-101N can be or may include any device that can communicate in a conference call via the network 110, such as a Personal Computer (PC), a telephone, a video phone, a cellular telephone, a Personal Digital Assistant (PDA), a tablet device, a notebook device, a smart-phone, and/or the like. As shown in FIG. 1, any number of communication endpoints 101A-101N may be connected to network 110. In addition, the communication endpoint 101 may be directly connected to the communication system 120. The communication endpoints 101A-101N each have a conference participant 102A-102N. In this embodiment, the conference participant 102A is a presenter of the conference call.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, video protocols, text protocols, email protocols, and/or the like.

The communication system 120 can be or may include any collection of communication equipment that can provide services via the network 110, such as a Private Branch Exchange (PBX), a central office switch, a router, a server, a proxy server, a session boarder controller, a gateway, a cloud conferencing service, a conferencing system, a mixer, a combination of these, and the like. The communication system 120 comprises a conference manager 121, a clustering module 122, a presentation module 123, a database 124, and a conference bridge 125. Although the elements 121-125 are shown in the communication system 120, the elements 121-125 may be distributed within the network 110. For example, the database 124 may be located on a server in the network 110. In some embodiments, some of the elements 121-125 may be distributed between the communication system 120 and the communication endpoints 101A-101N. For example, parts of the conferencing manager 121 and the presentation module 123 may be distributed between the communication system 120 and the communication endpoints 101A-101N (i.e., in a software application running on the communication endpoint 101).

The conferencing manager 121 can be or may include any hardware/software that can manage services provided by communication system 120, such as conference mixer, a conference bridge 125, a conferencing application, and/or the like.

The clustering module 122 can be or may include any hardware/software that can cluster information for a conference call. The clustering module 122 can use a variety of clustering algorithms to cluster information, such as, k-means clustering, hierarchical clustering, density-based clustering, multivariate clustering, normal distribution clustering, biclustering, and/or the like. Each cluster is presented to system users as a textual synopsis of the questions in this cluster. Clusters may be hierarchical, to allow a gradual "drill-down" from a top-level cluster to increasingly refined clusters. At each hierarchical level, the user has the option to view all questions contained in this cluster.

The presentation module 123 can be or may include any hardware/software that can generate and/or present information to a conference participant. For example, the presentation module 123 may comprise a web server, a software application, a display, a video card, a browser, and/or the like.

The database 124 can be any type of database 124 for storing information, such as a relational database, a directory service, a hierarchical database, a file system, a file, and/or the like. The database 124 can comprise multiple databases 124 distributed between multiple communication systems 120.

Figure 2:
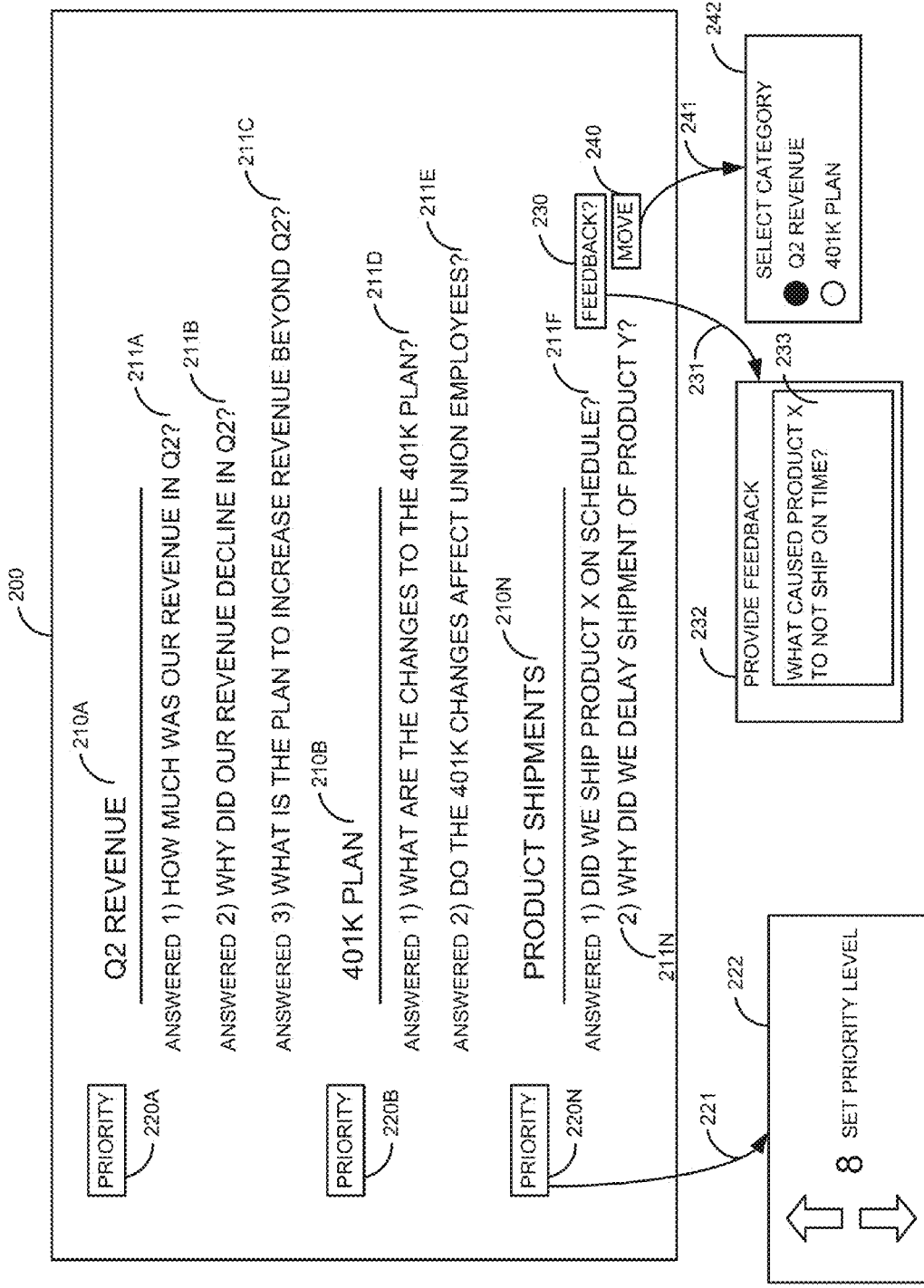
FIG. 2 is a diagram of a window for displaying a participant's view of a conference call.

FIG. 2 is a diagram of a window 200 for displaying a participant's view of a conference call (e.g., in the form of a user interface). The view in FIG. 2 is an illustrative view that of a conference participant (102B-101N) who is not the presenter (102A) of the conference call. The window 200 comprises categories 210A-210N, questions 211A-211N, priority buttons 220A-220N, a feedback button 230, and a move button 240. The window 200 allows a conference participant 102 to visualize the questions 211A-211N that have been submitted by one or more of the conference participants 102A-102N (or by other users who are not part of the conference call). Although not shown, the window 200 could display the name of the conference participant 102 who submitted the question 211. It should also be appreciated that the user interface of FIG. 2 can be partially or completely made available to sight-impaired users via known assistive technologies.

The categories 210A-210N are categories of questions 211A-211N that are a result of clustering the questions 211A-211N by the clustering module 122. The questions 211A-211N can be clustered based on keywords or phrases within the questions 211A-211N. For example, the questions 211A-211C have been clustered into the category "Q2 REVENUE" (210A) based on the questions 211A-211C all containing the keywords "revenue" and "Q2." The questions 211D-211E in the category "401K PLAN" (210B) are clustered based on the word "401K." Likewise, the questions 211F-211N in the category "PRODUCT SHIPMENTS" (210N) are clustered in a similar manner.

In one embodiment, the categories do not have to have common keywords or phrases. Similar keywords and/or phrases can be used. For example, if a question included the phrase "retirement account," this question can also be grouped in the 401K PLAN category 210B.

The conference participant 102 can view the window 200 to see the status of the questions 211A-211N that have been submitted for the conference call. For example, the status of the questions 211A-211F is that the questions 211A-211F have been answered by the presenter 102A.

When a conference participant 102 joins the conference call, the conference participant 102 can set a discussion priority of each category 210A-210N by selecting the corresponding priority button 220A-220N associated with each of the categories 210A-210N. The conference participant 102 can select in step 221 the priority button 220N to bring up a priority window 222. The conference participant 102 can set a priority for the category "PRODUCT SHIPMENTS" 210N. For example, the conference participant 102 may select the up arrow in the priority window 222 to increase the priority from 8 (as shown) to 9 or 10 (on a scale of 1-10). The priority is feed back to the presenter 102A (e.g., as shown in FIG. 3 priority column 310). In one embodiment, this may cause the order of the categories 210A-210N to change. Although not shown, the conference participant 102 may also change the priority for each of the questions 211A-211N in a similar manner.

In this embodiment, the conference participant 102 can provide feedback 233 for a specific question 211F that the conference participant 102 submitted. The conference participant 102 can provide feedback 233 based on how the presenter 102A answered the conference participant's question 211F. For example, by selecting the feedback button 230 in step 231, the conference participant 102 can provide feedback 233 in the feedback window 232. In this embodiment, only the conference participant 102 who submitted the question 211 can provide the feedback. However, in other embodiments, other participants (including all the conference participants 102B-102N) may provide feedback in a similar manner.

In this embodiment, the conference participant 102 can move a question 211N to another category 210A-210B. If the conference participant 102 believes that the clustering algorithm has improperly placed the question 211N in the wrong category 210N, the conference participant can move the question 211N to a new category 210A-210B. For example, the conference participant 102 can select the move button 240 in step 241 to bring up the move window 242. The user can then select which category 210A-210B to move the question 211N.

In one embodiment, the questions 211 can be formatted to make the questions 211 easier for the presenter 102A to read. This can include highlighting important keywords that differentiate the questions 211 from others questions 211 in the same category 210 (cluster).

FIG. 3 is a diagram of a window 300 for displaying a presenter's view of a conference call. The window 300 comprises the categories 210A-210N, the questions 211A-211N, a priority column 310, conferencing buttons 320A-320N, answer checkbox 330 (and answer checkboxes for each category 210A-210N and each question 211A-211N), and trend column 340.

The priority column 310 displays the priority for each column 310A-210N. The priorities in the priority column 310 can be calculated based on various factors, such the number of questions 211 in each category 210, based on input from the conference participants 102 in the priority window 222 of FIG. 2, based on a trend from previous conference calls (e.g., similar questions 211 in a previous conference call), and/or the like. The priorities in the priority column 310 may be calculated dynamically during the conference call.

The conference buttons 320A-320N can be used to conference in conference participants 102 who have submitted the questions 211A-211N in a particular category 210A-210N. In FIG. 3, the conference buttons 320A-320N are associated with a specific category 210A-210N. However, in other embodiments, the conference button 320 may be associated with an individual question 211. In large conference calls, typically only the presenter 102A is permitted to speak (i.e., the presenter's message is broadcast to the other communication endpoints 101B-101N). For example, for a large conference call where the CEO (e.g., the presenter 102A) of a company has a quarterly meeting to address the company, the CEO (the presenter 102A) will generally speak to the whole company in broadcast mode.

The presenter 102A can select one of the conference buttons 320A-320N from one of the categories 210A-210N. In FIG. 3, the presenter 102A has selected conference button 320N in step 321. This results in the conferencing window 322 being displayed to the presenter 102A. The presenter 102A can then select conference participants 102 who submitted questions 211F-211N in the category 210N. Which conference participants 102 are selected to be conferenced into the conference call can be based on various criteria, such as, all the conference participants 102 who submitted questions 211F-211N, a specific category of conference participants 102 who submitted questions 211F-211N, a random selection from the conference participants 102 who submitted questions 211F-211N, a first submitter of question 211F, a submitter of a specific question 211F or 211N, a number of first conference participants 102 who submitted the questions, a demographic of the conference participants 102 who submitted the questions 211F-211N, and/or the like.

Based on the conference participants 102 selected (a group), one or more communication endpoints 101B-101N of the group of conference participants 102 who submitted questions are conferenced into the conference call. The presenter 102A can then discuss the questions with the selected conference participants 102, which may corresponds to a subset of all conference participants.

The answered checkbox 330 for either the category 210 or the question 210 can be checked by the presenter 102A as the questions are answered. This results in the questions 211 being shown as answered in FIG. 2. In FIG. 3, questions 211A-211F have been checked. This is reflected in FIG. 2 where each of these questions is shown as answered. The answer checkbox 330 can also be associated with a category 210A-210N. When the presenter checks the checkbox 330 associated with a category 210A-210N, all the answer checkboxes 330 for the questions 211 are checked.

The trend column 340 shows trends for the categories 210A-210N. The trends are based on questions 211 submitted in previous conference calls. For example, if there was two questions 211 asked in regard to revenue in the last conference call, the tend for the Q2 REVENUE 210A would be up 50% because there are now three questions associated with the Q2 REVENUE 210A. If there were no previous questions asked on the previous conference call(s), the trend would be non-applicable (N/A as shown for the 401K PLAN category 210B.

To illustrate, consider the following example. Prior to a conference call, the conference manager 121 receives questions 211A-211N for the conference call via email and text messaging. The email and text messages are stored in the database 124. The clustering module 122 clusters the questions 211A-211N into the categories 210A-210N. The conference bridge 125 establishes a voice conference call between the presenter 102A and the conference participants 102B-102N. The presentation module 123 generates and sends the clustered questions 211A-211N as shown in FIG. 3 to the presenter 102A (e.g., via a web page). The presentation module 123 sends the clustered questions 211A-211N as shown in FIG. 2 to the conference participants 102B-102N (e.g., via the web page).

The conference participant 102B selects the priority button 220N to set a higher priority for ranking the category 210N. In response, the conference manager 121 updates the priority in the priority column 310. The presenter 102A discusses the questions 211A-211E in order and checks the answer checkboxes 330 for each question 211A-211E as the questions 211A-211E have been answered. The conference manager 121 detects that the presenter 102A has check each of the answer checkboxes 330 for the questions 211A-211E and the presentation module 123 updates the window 200 to indicate that the questions 211A-211E have been answered.

After the presenter 120A answers the question 211F and selects the answer checkbox for question 211F, the conference participant 102B selects the feedback button 230 and provides the feedback 233 in the feedback window 232 and submits the feedback 233. The conference manager 121 detects the feedback 233 and updates the window 300 via the presentation module 123. The feedback 233 is now displayed in window 300 for the presenter 102A to see. The presenter 102A can now respond to the feedback 233.

Based on the feedback 233, the presenter 102A decides to conference in the conference participant 102B. The presenter 102A selects the conference button 320N and selects conference participant 102B who submitted the question 211F in conferencing window 322 (the specific question button in the conference window 322). The conference manager 121 notifies the conference bridge 125 to conference in the conference participant 102B at communication endpoint 101B. The conference participant 102B in now conferenced into the conference call and can discuss the question 211F with the presenter 102A.

The conference participant 102B decides that the question 211N does not belong in category 210N. The conference participant 102B selects the move button 240. The conference participant 120B selects the Q2 REVENUE category 210A and moves the question 211N to the Q2 REVENUE category 210A. The conference manager 121 updates, via the presentation module 123, the windows 200 and 300 to shown the question 211N is now in the Q2 REVENUE category 210A.

Figure 4:
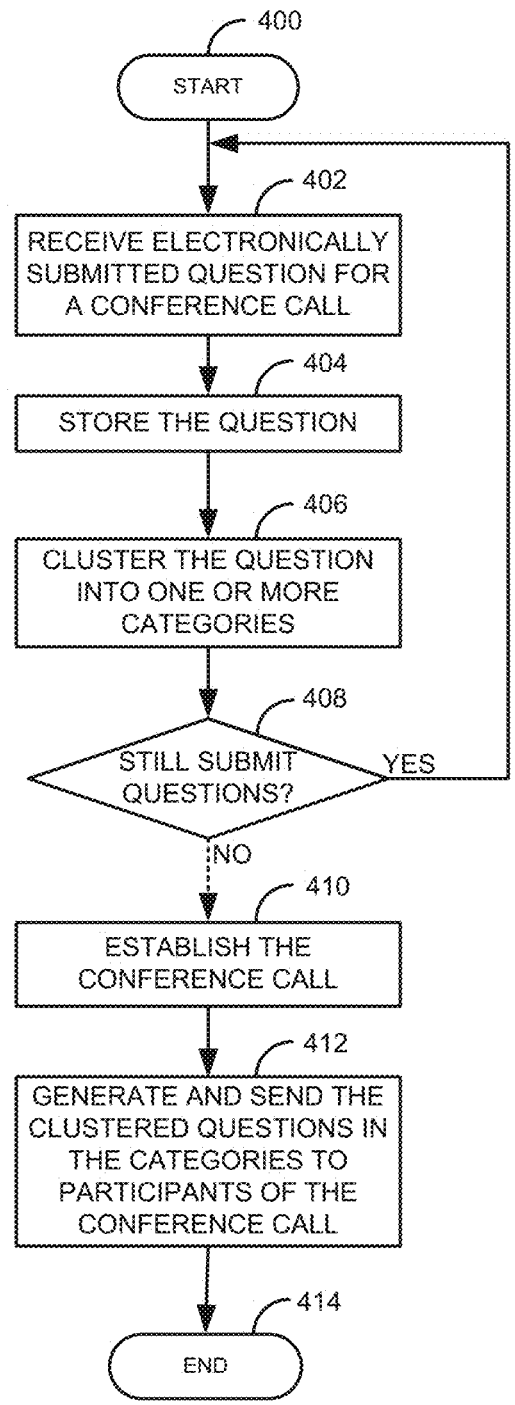
FIG. 4 is a flow diagram of a process for managing a conference call.

FIG. 4 is a flow diagram of a process for managing a conference call. Illustratively, the communication endpoints 101A-101N, the communication system 120, the conference manager 121, the clustering module 122, the presentation module 123, the database 124, and the conference bridge 125 are stored-program-controlled entities, such as a computer or processor, which performs the method of FIGS. 4-7 and the processes described herein by executing program instructions stored in a tangible computer readable storage medium, such as a memory or disk. Although the methods described in FIGS. 4-7 are shown in a specific order, one of skill in the art would recognize that the steps in FIGS. 4-7 may be implemented in different orders and/or be implemented in a multi-threaded environment. Moreover, various steps may be omitted or added based on implementation.

The process starts in step 400. The process receives an electronically submitted question for a conference call in step 402. The conference call can be an audio conference call, a video conference call, a multimedia conference call, an Instant Messaging (IM) conference call, and/or the like. The question can be any type of question that may be discussed in the conference call. The question can be submitted electronically in various ways, such as, via email, IM, voice converted to text, a recorded voice message, a combination of these, and the like. For example, the conference participant can send an IM via the communication endpoint 101B before or during the conference call. The questions are stored in step 404.

The questions are clustered into one or more categories in step 406. The process determines in step 408 if the conference participants can still submit questions in step 408. If the conference participants can still submit questions in step 408, the process goes to step 402 to receive additional questions for the conference call. In one embodiment, the steps 402-408 are a separate thread that waits for questions to be received before and during the conference call (which is slightly different from what is shown in FIG. 4). This is indicated by the dashed lines between steps 408 and 410.

Otherwise, if questions cannot still be submitted in step 408, the process goes to step 410. The conference call is established in step 410. The process generates and sends the clustered questions in the clustered categories to participants of the conference call in step 412 as described in FIGS. 1-3. The process ends in step 414.

Figure 5:
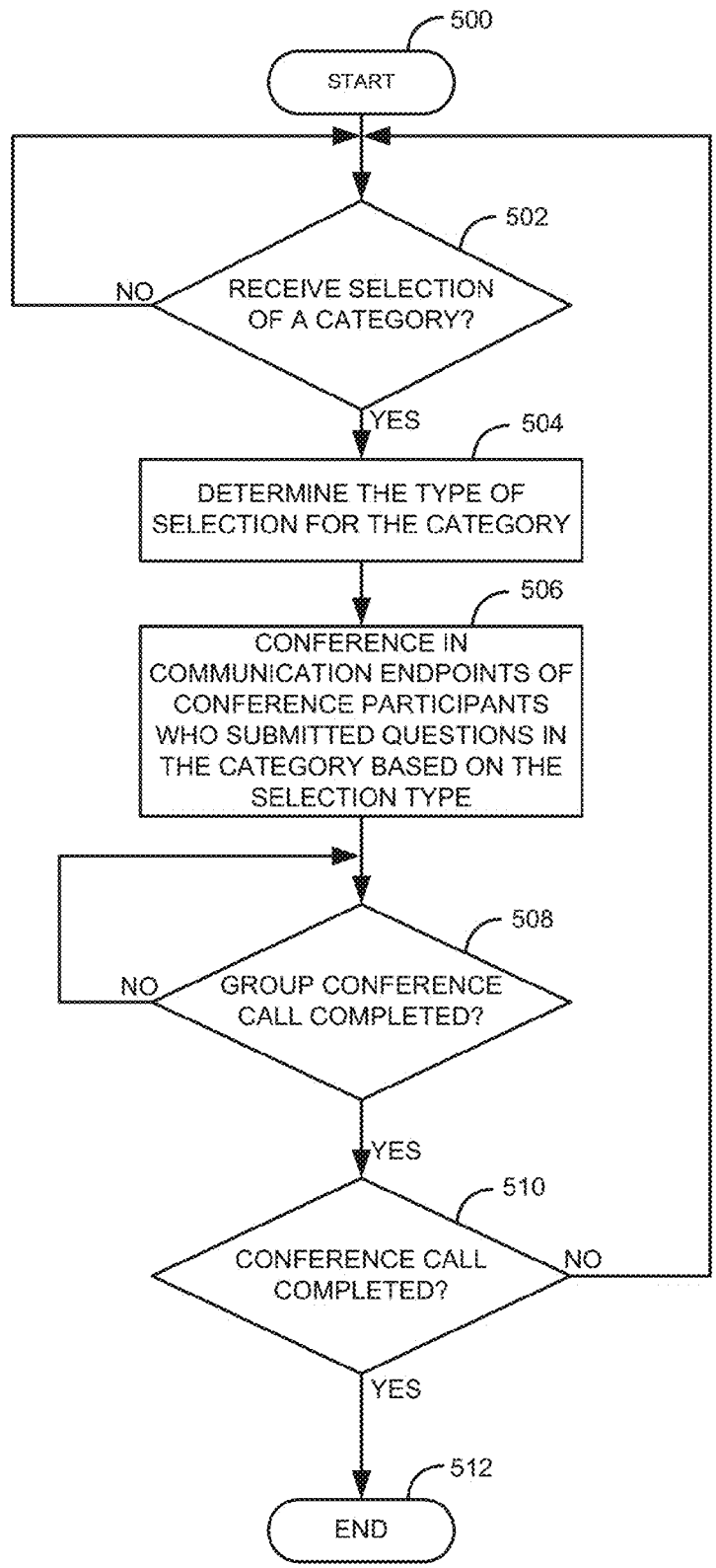
FIG. 5 is a flow diagram of a process for conferencing in participants who submitted questions.

FIG. 5 is a flow diagram of a process for conferencing in participants who submitted questions. The process starts in step 500. The process waits to receive a selection of a category in step 502. If a selection of a category is not received in step 502, the process repeats step 502.

Otherwise, if a selection of a category is received in step 502, the process determines the type of selection for the category in step 504. The type of selection can to conference in all conference participants in a group of conference participants who submitted questions in the selected category. The selection can be a categorization of individual conference participants of the group of conference participants who submitted questions in the selected category, a random selection of individual conference participants of the group of conference participants who submitted questions in the selected category, a first conference participant in the group of conference participants who first submitted a question in the selected category, a first number of conference participants in the group who first submitted questions in the selected category (e.g., the first two participants who submitted questions), a conference participant who submitted a specific question, based on a demographic of the individual conference participants of the group of conference participants who submitted questions in the selected category, and/or the like.

The process conferences in communication endpoints of conference participants who submitted questions in the category based on the selection type in step 506. The process determines in step 508 if the conference call for the group of participants has been completed in step 508. If the conference call for the group of participants has not been completed in step 508, the process repeats step 508.

Otherwise, if the conference call for the group of conference participants has been completed in step 508, the process determines if the conference call is completed in step 510. If the process determines in step 510 that the conference call is not completed in step 510, the process goes to step 502. Otherwise, if the process determines in step 510 that the conference call is completed, the process ends in step 512.

Although FIG. 5 shows that only one selected group can be conferenced in at a time, in other embodiments, a presenter could conference on additional conference participants into the group conference (in step 508 on the no branch) for various reasons, such as based on the discussion in the group conference, such as conferencing in an additional conference participant who submitted a question in the category, based on feedback, and/or the like.

Figure 6:
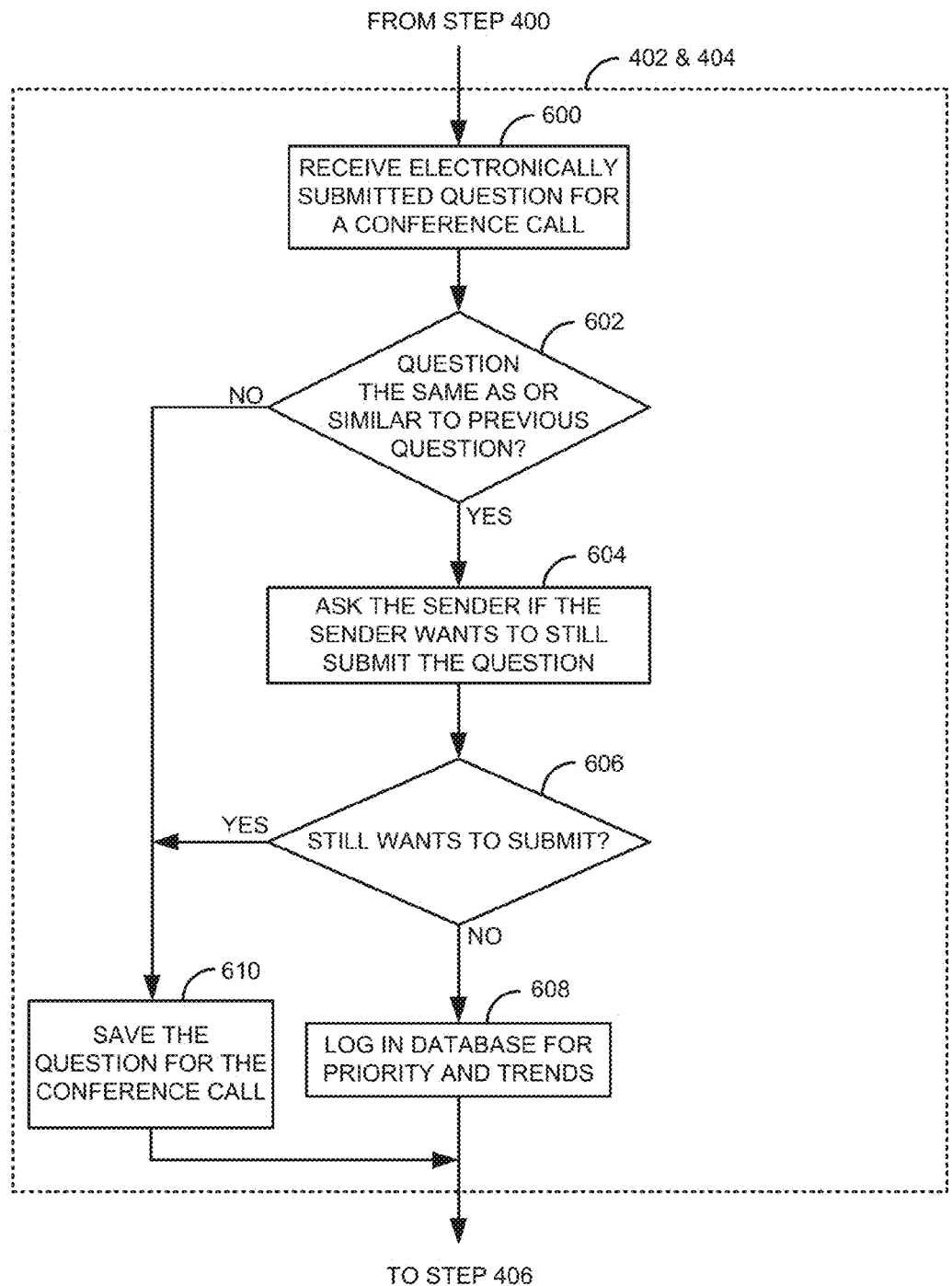
FIG. 6 is a flow diagram of a process for managing questions submitted by participants of a conference call.

FIG. 6 is a flow diagram of a process for managing questions submitted by participants of a conference call. The process of FIG. 6 is an illustrative embodiment of steps 402 and 404 of FIG. 4. The process receives an electronically submitted question for the conference call in step 600. The process determines in step 602 if the submitted question is the same as or similar to a previously submitted question. If the submitted question is not the same as or similar to a previously submitted question in step 602, the process saves the question for the conference call in step 610 and then goes to step 406.

Otherwise, if the submitted question is the same as or similar to a previously submitted question in step 602, the process asks the sender of the submitted question if the submitter still wants to submit the question to be displayed in the conference call in step 604. The process can ask the sender of the submitted question by displaying the previously submitted question. If the sender of the submitted question still wants to submit the question in step 606, the process saves the question for the conference call in step 610 and then goes to step 406.

Otherwise, if the submitter of the question does not want to submit the question in step 606, the process logs that the same or similar question was initially submitted to establish priority and/or trends in step 608. For example, if there were 20 questions submitted, but only one question was actually stored for the conference call, this question will have higher priority over another category of questions where only two questions were submitted. The process then goes to step 406.

In one embodiment, the process may skip steps 604, 606, and optionally 608. When the question is determined to be the same as or similar to a previous question in step 602, the process can go directly to step 608 or 406.

Figure 7:
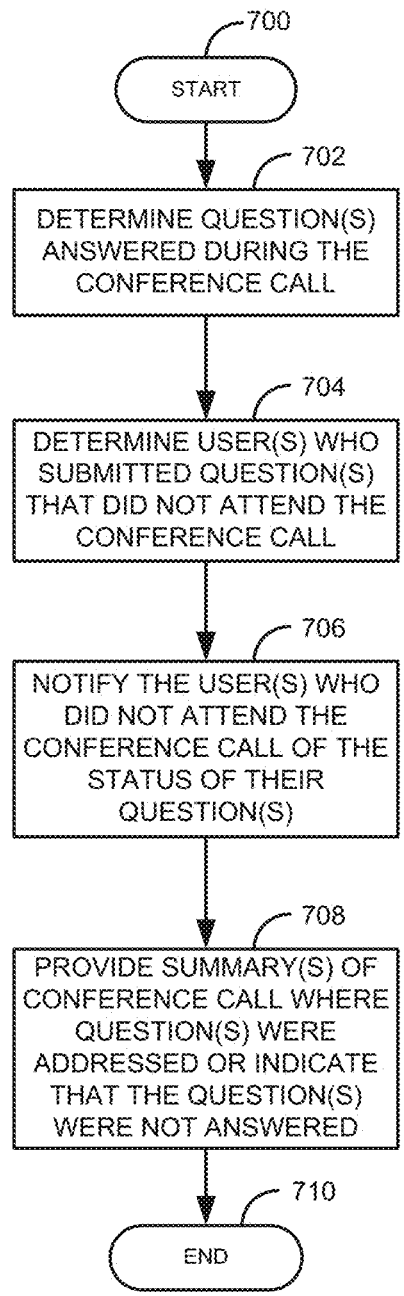
FIG. 7 is a flow diagram of a process for providing a summary of a conference call for participants who submitted questions, but did not attend the conference call.

FIG. 7 is a flow diagram of a process for providing a summary of a conference call for participants who submitted questions, but did not attend the conference call. The process starts in step 700. The process determines which questions were answered during the conference call in step 702. This determination made be made automatically (e.g., by an automated process comparing questions or question groups with answers or discussions during the conference) or manually (e.g., with input from conference participants and/or the presenter identifying whether or not a question or group of questions was addressed). The process determines user(s) who submitted questions that did not actually attend the conference call in step 704. The process can determine which user(s) did not attend the conference call based on various criteria, such as based on voice recognition, facial recognition, a caller ID of the user, a login of the user, and/or the like.

The process notifies the user(s) who did not attend the conference call of the status of their question(s) in step 706. For example, the process can notify a user that her submitted question was answered or not answered during the conference call in step 706. The process provides a summary or summaries of the conference call where the question(s) were addressed and/or indicate that the question(s) were not answered in the conference call in step 708. The summary can be a voice or text transcript of the portion of the conference call where the question(s) were answered. The process then ends in step 710.

The above process is for users who did not attend the conference call. However, in other embodiments, the status/summaries can be sent to participants who attended the conference call. For example, the process can send summaries to each person who submitted a question, regardless of whether the submitter of the question attended the conference call or not.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system for managing a multimedia conference call comprising:
   a microprocessor; and
   a computer readable medium, coupled with the microprocessor and comprising microprocessor readable and executable instructions that cause the microprocessor to execute:
      a conference manager that receives a plurality of questions for the multimedia conference call, wherein the plurality of questions are electronically submitted by one or more of a plurality of conference participants, wherein at least one of the plurality of questions is received in real-time during the multimedia conference call, and wherein the multimedia conference call is initially only broadcast, via a network, to the plurality of conference participants at a plurality of communication endpoints;
      a clustering module that clusters, in real-time, the plurality of questions into one or more categories for presentation in the multimedia conference call; and
      a presentation module that sends, via the network, in a video media of the multimedia conference call, the clustered plurality of questions in the one or more categories to the plurality of communication endpoints of the plurality of conference participants, wherein the video media comprises a visual presentation of a presenter and wherein sending the clustered plurality of questions comprises electronically inserting, in real-time, at least one of the clustered plurality of questions received during the multimedia conference call into the video media of the multimedia conference call.

2. The system of claim 1, wherein the one or more categories comprises a plurality of categories, and wherein:
   the conference manager receives a selection, from the communication endpoint of the presenter, of one of the plurality of categories and identifies a group of conference participants who submitted questions in the selected one of the plurality of categories; and
   a conferencing system that selects one or more communication endpoints of the group of conference participants who submitted questions to communicate in the multimedia conference call.

3. The system of claim 2, wherein the selected one or more communications devices are selected based on one of the following:
   all conference participants in the group of conference participants;
   a categorization of individual conference participants of the group of conference participants;
   a random selection of individual conference participants of the group of conference participants;
   a first conference participant in the group of conference participants who first submitted a question;
   a first number of conference participants in the group who first submitted questions;
   a specific question; and
   a demographic of the individual conference participants of the group of conference participants.

4. The system of claim 1, wherein the plurality of conference participants in the multimedia conference call can provide input to rank a priority of the one or more categories and wherein the ranked priority is presented to the presenter.

5. The system of claim 1, wherein the conference manager determines that one of the plurality of received questions is similar to or the same as a previously submitted question and queries a sender of the similar or same question if the sender of the similar or same questions wants to still submit the similar or same question in response to the one of the plurality of questions being similar to or the same as the previously submitted question.

6. The system of claim 1, wherein the conference manager determines that a question in one of the one or more categories was answered and identifies that the question in the one of the one or more categories was answered.

7. The system of claim 6, wherein the conference manager receives feedback for the answering of the question in the one of the one or more categories and sends the feedback to the presenter of the multimedia conference call.

8. The system of claim 1, wherein one of the clustered plurality of questions can be moved to a different category in the visual presentation of the presenter by a conference participant who submitted the one of the clustered plurality of questions.

9. The system of claim 1, wherein a history of questions in one or more previous conference calls and the plurality of questions are used to identify a trend and wherein the presentation module sends the trend to the presenter of the multimedia conference call.

10. The system of claim 1, wherein:
    the conference manager determines that one of the plurality of questions for the multimedia conference call was answered, determines that a conference participant who submitted the one of the plurality of questions did not attend the multimedia conference call, and notifies the conference participant who submitted the one of the plurality of questions that the that one of the plurality of questions was answered in the multimedia conference call, and provides a summary of how the one of the plurality of questions was answered in the multimedia conference call.

11. A method comprising:
    receiving, by a microprocessor, a plurality of questions for a multimedia conference call, wherein the plurality of questions are electronically submitted by one or more of a plurality of conference participants, wherein at least one of the plurality of questions is received in real-time during the multimedia conference call, and wherein the multimedia conference call is initially only broadcast, via a network, to the plurality of conference participants at a plurality of communication endpoints;
    clustering, by the microprocessor, in real-time, the plurality of questions into one or more categories for presentation in the multimedia conference call; and
    sending, by the microprocessor, via the network, in a video media of the multimedia conference call, the clustered plurality of questions in the one or more categories to the plurality of conference participants, wherein the video media comprises a visual presentation of a presenter and wherein sending the clustered plurality of questions comprises electronically inserting, in real-time, at least one of the clustered plurality of questions received during the multimedia conference call.

12. The method of claim 11, wherein the one or more categories comprises a plurality of categories, and further comprising:
receiving, by the microprocessor, a selection, from the communication endpoint of the presenter, of one of the plurality of categories;
identifying, by the microprocessor, a group of conference participants who submitted questions in the selected one of the plurality of categories; and
selecting, by the microprocessor, one or more communication endpoints of the group of conference participants who submitted questions to communicate in the multimedia conference call.

13. The method of claim 12, wherein the selected one or more communications devices are selected based on one of the following:
all conference participants in the group of conference participants;
a categorization of individual conference participants of the group of conference participants;
a random selection of individual conference participants of the group of conference participants;
a first conference participant in the group of conference participants who first submitted a question;
a first number of conference participants in the group who first submitted questions;
a specific question; and
a demographic of the individual conference participants of the group of conference participants.

14. The method of claim 11, wherein the plurality of conference participants in the multimedia conference call can provide input to rank a priority of the one or more categories and wherein the ranked priority is presented to the presenter.

15. The method of claim 11, further comprising:
determining, by the microprocessor, that one of the plurality of received questions is similar to or the same as a previously submitted question; and
querying, by the microprocessor, a sender of the similar or same question if the sender of the similar or same questions wants to still submit the similar or same question in response to the one of the plurality of questions being similar to or the same as the previously submitted question.

16. The method of claim 11, further comprising:
determining, by the microprocessor, that a question in one of the one or more categories was answered; and
identifying, by the microprocessor, that the question in the one of the one or more categories was answered.

17. The method of claim 16, further comprising:
receiving, by the microprocessor, feedback for the answering of the question in the one of the one or more categories; and
sending, by the microprocessor, the feedback to the presenter of the multimedia conference call.

18. The method of claim 11, wherein one of the clustered plurality of questions can be moved to a different category in the visual presentation of the presenter by a conference participant who submitted the one of the clustered plurality of questions.

19. The method of claim 11, further comprising:
identifying, by the microprocessor, a trend based on a history of questions in one or more previous conference calls and the plurality of questions; and
sending, by the microprocessor, the trend to the presenter of the multimedia conference call.

20. The method of claim 11 further comprising:
determining, by the microprocessor, that one of the plurality of questions for the multimedia conference call was answered;
determining, by the microprocessor, that a conference participant who submitted the one of the plurality of questions did not attend the multimedia conference call;
notifying, by the microprocessor, the conference participant who submitted the one of the plurality of questions that the that one of the plurality of questions was answered in the multimedia conference call; and
providing, by the microprocessor, a summary of how the one of the plurality of questions was answered in the multimedia conference call.

* * * * *